(12) United States Patent
Yamagishi et al.

(10) Patent No.: US 10,960,580 B2
(45) Date of Patent: Mar. 30, 2021

(54) MOLDED FOAM, METHOD FOR MANUFACTURING MOLDED FOAM, MOLD AND METHOD FOR MANUFACTURING MOLD

(71) Applicant: SEKISUI PLASTICS CO., LTD., Osaka (JP)

(72) Inventors: Takamasa Yamagishi, Ibaraki (JP); Takahito Kurosaki, Tokyo (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 326 days.

(21) Appl. No.: 16/080,118

(22) PCT Filed: Jan. 23, 2017

(86) PCT No.: PCT/JP2017/002161
§ 371 (c)(1),
(2) Date: Aug. 27, 2018

(87) PCT Pub. No.: WO2017/149998
PCT Pub. Date: Sep. 8, 2017

(65) Prior Publication Data
US 2019/0070755 A1    Mar. 7, 2019

(30) Foreign Application Priority Data

Feb. 29, 2016 (JP) .............................. JP2016-037745
Feb. 29, 2016 (JP) .............................. JP2016-037748

(51) Int. Cl.
*B60R 19/34* (2006.01)
*B29C 33/38* (2006.01)
(Continued)

(52) U.S. Cl.
CPC .......... *B29C 33/3842* (2013.01); *B29C 33/38* (2013.01); *B29C 33/3857* (2013.01);
(Continued)

(58) Field of Classification Search
CPC ..... B29C 66/71; B29C 44/58; B29K 2105/04; C08L 2666/02; C08L 2666/04;
(Continued)

(56) References Cited

U.S. PATENT DOCUMENTS 3,979,487 A * 9/1976 Squier ..................... B44F 11/00
                                                              264/419
4,130,615 A * 12/1978 Decker, Jr. ........... B29C 44/146
                                                              264/130

(Continued)

FOREIGN PATENT DOCUMENTS

JP    53-73270    6/1978
JP    7-246888    9/1995
(Continued)

OTHER PUBLICATIONS

International Search Report dated Apr. 4, 2017 in International Application No. PCT/JP2017/002161.

*Primary Examiner* — Kiran B Patel
(74) *Attorney, Agent, or Firm* — Wenderoth, Lind & Ponack, L.L.P.

(57) ABSTRACT

Provided are a molded foam (1) that is lightweight and can be manufactured at low cost, and can reduce abnormal noise due to friction with a vehicle structure effectively and for a long time, and a mold (10) that can mold a molded foam that is beautiful and attractive in appearance.

6 Claims, 9 Drawing Sheets (51) Int. Cl.
*B60N 3/04* (2006.01)
*B60R 13/08* (2006.01)
*B29C 44/58* (2006.01)
*B29C 33/42* (2006.01)
*B29C 44/44* (2006.01)
*B29C 44/34* (2006.01)
*B29K 25/00* (2006.01)
*B29C 33/56* (2006.01)

(52) U.S. Cl.
CPC .......... *B29C 33/424* (2013.01); *B29C 44/445* (2013.01); *B29C 44/58* (2013.01); *B60N 3/04* (2013.01); *B60N 3/048* (2013.01); *B60R 13/08* (2013.01); *B29C 33/56* (2013.01); *B29C 44/3426* (2013.01); *B29K 2025/06* (2013.01); *B29K 2995/0072* (2013.01); *Y10T 428/249953* (2015.04)

(58) Field of Classification Search
CPC ......... Y10T 24/2792; Y10T 428/24017; Y10T 24/27; C08F 220/14; C08F 220/22
See application file for complete search history.

(56) References Cited

U.S. PATENT DOCUMENTS

| | | | |
|---|---|---|---|
| 4,839,227 A * | 6/1989 | Hoopman | H01L 24/72 428/343 |
| 5,863,091 A * | 1/1999 | Shepherd | B32B 27/02 296/184.1 |
| 5,897,734 A * | 4/1999 | Sugihara | B32B 5/02 156/228 |
| 6,261,667 B1 * | 7/2001 | Yang | B60N 3/044 15/215 |
| 6,610,382 B1 * | 8/2003 | Kobe | B25G 1/10 428/119 |
| D514,493 S * | 2/2006 | MacNeil | D12/203 |
| 2002/0045029 A1 * | 4/2002 | Yung | B32B 3/30 428/172 |
| 2002/0061386 A1 * | 5/2002 | Carson | B32B 3/266 428/131 |
| 2003/0097806 A1 * | 5/2003 | Brown | E04B 5/04 52/220.1 |
| 2005/0077748 A1 * | 4/2005 | Brown | B62D 43/10 296/100.02 |
| 2005/0123726 A1 * | 6/2005 | Broering | B32B 3/30 428/172 |
| 2005/0191921 A1 * | 9/2005 | Tilton | B32B 5/14 442/120 |
| 2005/0281978 A1 * | 12/2005 | Cabell | B32B 37/20 428/97 |
| 2007/0148409 A1 * | 6/2007 | Rios | A63B 60/06 428/167 |
| 2008/0080934 A1 * | 4/2008 | Duffney | B08B 15/02 405/128.2 |
| 2008/0141520 A1 | 6/2008 | Takakura et al. | |
| 2009/0162596 A1 * | 6/2009 | Rios | B32B 5/18 428/45 |
| 2009/0162651 A1 * | 6/2009 | Rios | B32B 23/048 428/354 |
| 2009/0174224 A1 * | 7/2009 | Takakura | B60R 13/083 296/193.07 |
| 2010/0320030 A1 * | 12/2010 | Ogawa | B32B 29/007 181/294 |
| 2011/0108359 A1 * | 5/2011 | Nishimura | B32B 29/002 181/290 |
| 2011/0214798 A1 * | 9/2011 | Tracy | C09J 7/22 156/71 |
| 2012/0322331 A1 * | 12/2012 | Worthington | B32B 5/028 442/381 |
| 2014/0004322 A1 * | 1/2014 | Kim | F16F 3/0876 428/201 |
| 2014/0182049 A1 * | 7/2014 | Prust | A43B 13/38 2/410 |
| 2014/0248085 A1 * | 9/2014 | Zajicek | E02D 31/004 405/129.75 |
| 2016/0007671 A1 * | 1/2016 | Prust | B62J 1/20 2/411 |
| 2016/0039380 A1 * | 2/2016 | Kawano | B60R 21/04 280/751 |
| 2018/0229466 A1 * | 8/2018 | Hata | B29C 65/028 |
| 2018/0281518 A1 * | 10/2018 | Joyce | B60B 39/12 |
| 2019/0270397 A1 * | 9/2019 | Owens | B60N 3/048 |
| 2020/0398612 A1 * | 12/2020 | Joyce | B60B 39/12 |

FOREIGN PATENT DOCUMENTS

| | | |
|---|---|---|
| JP | 10-298341 | 11/1998 |
| JP | 2004-306791 | 11/2004 |
| JP | 2006-231633 | 9/2006 |
| JP | 2007-290567 | 11/2007 |
| JP | 2007-302166 | 11/2007 |
| JP | 2008-194994 | 8/2008 |
| JP | 2011-224828 | 11/2011 |
| JP | 2014-8659 | 1/2014 |

* cited by examiner

| SAMPLE NO. | MATERIALS OF MOLDED FOAM | COLOR | SURFACE STATE | EXPANSION RATIO | GLOSS VALUE | EFFECT OF REDUCING NOISE | MATERIAL OF WOODEN FORM AND MOLD MACHINING | EVALUATION OF APPEARANCE |
|---|---|---|---|---|---|---|---|---|
| EX.1 | PS+PE | WHITE | GRAINED SURFACE 1 | 35 TIMES | 4 | GOOD | EPS/A | GOOD |
| EX.2 | PS+PE | WHITE | GRAINED SURFACE 2 | 35 TIMES | 5.1 | GOOD | CW/A | GOOD |
| EX.3 | PS+PE | WHITE | REGULAR DEPRESSIONS AND PROJECTIONS | 35 TIMES | 5.5 | GOOD | CW/B | GOOD |
| EX.4 | PS+PP | BLACK | GRAINED SURFACE 1 | 40 TIMES | 1 | GOOD | EPS/A | GOOD |
| EX.5 | PS+PP | BLACK | GRAINED SURFACE 2 | 40 TIMES | 1.5 | GOOD | CW/A | GOOD |
| EX.6 | PS+PP | BLACK | REGULAR DEPRESSIONS AND PROJECTIONS | 40 TIMES | 1.6 | GOOD | CW/B | GOOD |
| EX.7 | PS+PE | BLACK | GRAINED SURFACE 1 | 15 TIMES | 0.9 | GOOD | EPS/A | GOOD |
| EX.8 | PS+PE | BLACK | GRAINED SURFACE 2 | 15 TIMES | 1.5 | GOOD | CW/A | GOOD |
| EX.9 | PS | WHITE | GRAINED SURFACE 1 | 50 TIMES | 4 | GOOD | EPS/A | GOOD |
| EX.10 | PS | WHITE | GRAINED SURFACE 2 | 50 TIMES | 5.2 | GOOD | CW/A | GOOD |
| COMP. EX.1 | PS+PE | WHITE | NORMAL SURFACE | 35 TIMES | 10.5 | BAD | CW/B | BAD |
| COMP. EX.2 | PS+PE | BLACK | NORMAL SURFACE | 15 TIMES | 20.5 | BAD | CW/B | BAD |
| COMP. EX.3 | PS | WHITE | NORMAL SURFACE | 50 TIMES | 9.7 | BAD | CW/B | BAD |
| COMP. EX.4 | PP | WHITE | NORMAL SURFACE | 36 TIMES | 13 | BAD | CW/B | BAD |

EPS IN MATERIAL OF WOODEN FORM STANDS FOR EXPANDABLE POLYSTYRENE.
CW STANDS FOR CHEMICAL WOOD.
A IN MOLD MACHINING INDICATES NOT-POLISHED, AND B INDICATES POLISHED.

MOLDED FOAM, METHOD FOR MANUFACTURING MOLDED FOAM, MOLD AND METHOD FOR MANUFACTURING MOLD

TECHNICAL FIELD

The present invention relates to a molded, foam made of synthetic resin, and used for interior materials of vehicles. More particularly the present invention relates to a molded foam that can reduce abnormal noise, such as frictional sound with a vehicle structure and relates to a method for manufacturing such a molded foam. The present invention also relates to a mold to mold a molded foam made of synthetic resin, and more particularly relates to a mold to mold a molded foam that is beautiful and attractive in appearance and relates to a method for manufacturing such a mold.

BACKGROUND ART

Vehicles, such as cars, often include synthetic resin products as their interior materials. Although non-foaming synthetic resin products also may be used, a molded foam made of synthetic resin is used often because such a molded foam can give a more comfortable ride to passengers due to the improved shock-absorbing characteristics, can protect passengers by absorbing shock, and can give the flatness to the ear interior. Various types of synthetic resin can be used for expandable synthetic resin, such as polyurethane resins and polystyrene resins. Among them, expandable polystyrene resin is often used due to its excellent moldability and functionality.

A mold to mold an interior material for vehicles that is a molded foam made of synthetic resin includes a mobile mold and a fixed mold to define a cavity as a molding space therebetween. The fixed mold, for example, has a port, through which expandable resin particles are charged into the cavity. After charging the expandable resin particles into the cavity, heated steam is introduced into the cavity to heat the expandable resin particles for molding.

When such a molded foam made of synthetic resin comes in contact with a vehicle structure and rubs against each other, they may generate high-pitched grating abnormal noise, such as squeaky sound, due to the friction between them. Such abnormal noise gives an uncomfortable feeling to the passengers. Then to reduce the abnormal noise, felt, for example, may be attached to the rear face of a molded foam for vehicles. Such a configuration with felt has problems of high cost and an increased number of the following steps to attach the felt to the molded foam with adhesive or two-sided adhesive tape.

Patent Literature 1 proposes another solution of applying surfactant to both of contact faces of the components that are synthetic resin foams. Patent Literature 2 proposes another solution of providing a projection with a predetermined height at a part of an interior material for vehicles made of ABS resin, for example, the part being opposed to the attachment face of a predetermined attachment part of a vehicle, and forming a layer of coating film having a low coefficient of friction at the surface of the projection.

CITATION LIST

Patent Literature

Patent Literature 1: JP H10-298341 A
Patent Literature 2: JP H07-246888 A

SUMMARY OF INVENTION

Technical Problem

Such a method of applying surfactant to reduce abnormal noise as in Patent Literature 1 can have a certain effect for a long time at contact faces of the components as synthetic resin foams that come in contact with each other. Such a method, however, cannot keep such an effect for a long time when the contact is between a vehicle structure typically made of metal and a synthetic resin material (molded foam). Additionally it is not easy to apply surfactant to a contact face. A certain effect can be expected from the method of forming the layer of coating film having lower coefficient of friction at the contact face described in Patent Literature 2 when a suitable material is selected for the coating film based on the relationship with a material of the vehicle structure for a contact. Such an effect, however, will gradually deteriorate during the use for a long time because it is the coating film and the coating film is applied only at the surface.

A mold having the above configuration has a cavity as a molding space defined between a fixed mold and a mobile mold to manufacture the molded foam through expansion and molding. Since such a cavity of the mold typically has a shiny ground surface for molding, the molded foam manufactured in the cavity also has a shiny surface, which is a smooth and unchanged surface and so lacks aesthetic appeal.

In view of the above problems, the present invention has a first aim to provide a molded foam that can be manufactured at low cost, the molded foam being lightweight and reducing abnormal noise due to friction with a vehicle structure effectively and for a long time, and to provide a method for manufacturing such a molded foam.

A second aim of the present invention is to provide a mold that can mold a molded foam that is beautiful and attractive in appearance and a method for manufacturing such, a mold.

Solution to Problem

To achieve the first aim, a molded foam according to the present invention is a molded foam, that is placed m a vehicle structure, the molded foam being prepared by expanding and molding synthetic resin in a molding space of a mold. The molded foam comprises: a contact face that comes in contact with the vehicle structure; and a non-contact face that does not come in contact with the vehicle structure. The contact face is a rough surface, and the non-contact face is a smooth surface that is smoother than the contact face.

In the thus configured molded foam of the present invention, the contact face that comes in contact with the vehicle structure is a tough surface, and the non-contact face that does not come in contact with the vehicle structure is a smooth surface that is smoother than the contact face. This can reduce abnormal noise generated when this molded foam comes in contact with the vehicle structure and they rub against each other. That is, since the rough surfaces of the molded foam come in contact with the vehicle structure, this can reduce abnormal noise due to friction generated when a molded foam, such as a foam made of polystyrene resin, and a metal vehicle structure rub against each other. When a molded foam is molded with a mold, and the molded foam is released from the mold after molding, the molded foam can be released quickly from the mold because the smooth surface of the molded foam has a small contact resistance, and so the productivity can be improved.

In a preferable embodiment of the molded foam according to the present invention, the molded foam has a face opposed to the vehicle structure and includes depressions and projections at the face. The contact face is disposed at least at one of the depressions and the projections. In a preferable embodiment of the molded foam according to the present invention, the contact face is a rough surface having a gloss value in a range of 0.5 to 7, the gloss value indicating gloss of the contact face. With this configuration, since the contact face is a rough surface having the gloss value in the range of 0.5 to 7, this can reduce abnormal noise generated when this molded foam comes in contact with the vehicle structure, and they rub against each other.

In a preferable embodiment of the molded foam according to the present invention, one of faces of the molding space of the mold that is formed by transferring depressions and projections of a wooden surface of a wooden form forms the contact face, more specifically, a face formed by transferring depressions and projections of a wooden surface of a wooden form including chemical wood, for example, forms the contact face. With this configuration, a rough surface of a contact face can be easily formed. Preferably a floor spacer for vehicles and a luggage box for vehicles comprise the molded foam as stated above.

A method for manufacturing a molded foam according to the present invention is to manufacture the molded foam as stated above, and comprises: filling the molding space with expandable resin particles; and expanding the expandable resin particles by introducing heated steam into the molding space.

To achieve the second aim, a mold according to the present invention, includes a mobile mold and a fixed mold to define a molding space therebetween, the mold being configured to manufacture a molded foam by expanding and molding synthetic resin in the molding space. At least a part of a defining face to define the molding space has a rough surface. The rough surface may be a grained face or an embossed face, for example.

The thus configured mold of the present invention has a rough surface at at least a part of the defining face. Therefore a molded foam molded with this mold can have a rough surface at least a part of the surface, which is not a glossy surface but a matte surface. The entire surface of the molded foam therefore is not a smooth glossy surface but has a matte state, such as a grained surface, and the molded foam can have beautiful and attractive appearance.

In a preferable embodiment of the mold according to the present invention, at least a part of the defining face is a rough surface that is formed by transferring depressions and projections of a wooden surface of a wooden form. With this configuration, at least a part of the defining face to define the molding space is a rough surface that is formed by transferring depressions and projections of a wooden surface of a wooden form. Therefore, the molded foam can have beautiful appearance and have high quality by making use of the depressions and projections of the wooden surface. Preferably the rough surface of the defining face is formed at a part to form an outer surface of the molded foam. With this configuration, the outer surface of the molded foam can be a rough finish surface, and so can have a high design effect.

In a method for manufacturing a mold according to the present invention, at least a part of a defining face to define the molding space, a rough surface is formed by transferring depressions and projections of a wooden surface of a wooden form. Preferably the wooden form comprises chemical wood. With this configuration, a rough surface can be easily formed at least a part of the defining face, and the rough surface can be formed easily with chemical wood.

Advantageous Effects of Invention

The molded foam of the present invention can reduce grating abnormal noise due to robbing with a vehicle structure at a contact part. The method for manufacturing a molded foam of the present invention does not require post-process, and the molded foam can be manufactured at low cost.

The mold of the present invention can manufacture a molded foam having a rough finish surface that is not glossy at least a part of the surface. In this way, the appearance of the molded foam can be changed unlike the appearance of the entire surface that is a flat plate having a smooth and glossy surface, and can have attractive appearance. For instance, when the molded foam is a luggage box for vehicles, the upper face that is conspicuous to a riser can have such a rough finish surface, whereby the luggage box can have improved overall texture. When the molded foam is a floor spacer, its circumferential edges of the upper face, for example, can have a rough finish, surface, whereby the floor spacer can have improved aesthetic appeal.

DESCRIPTION OF EMBODIMENTS

Figure 1:
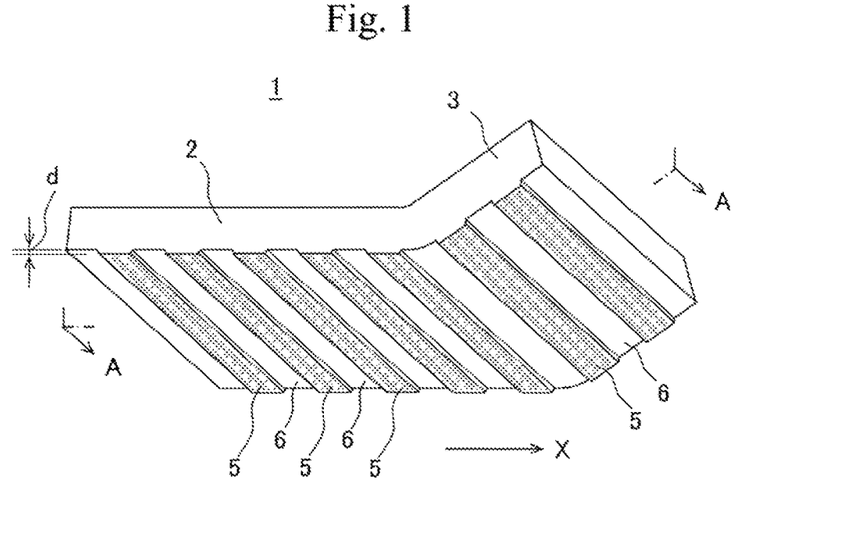
FIG. 1 is a perspective view of a floor spacer that is one embodiment of a molded foam for vehicles according to the present invention.

Referring to the drawings, the following describes a floor spacer that is one embodiment of a molded foam for vehicles according to the present invention in details. FIG. 1 is a perspective view of the floor spacer according to the present embodiment. FIG. 2(a) is an enlarged cross-sectional view of the major part taken along the line A-A of FIG. 1. FIG. 2(b) is a cross sectional view of the major part of a modified example of the floor panel.

Figure 2:
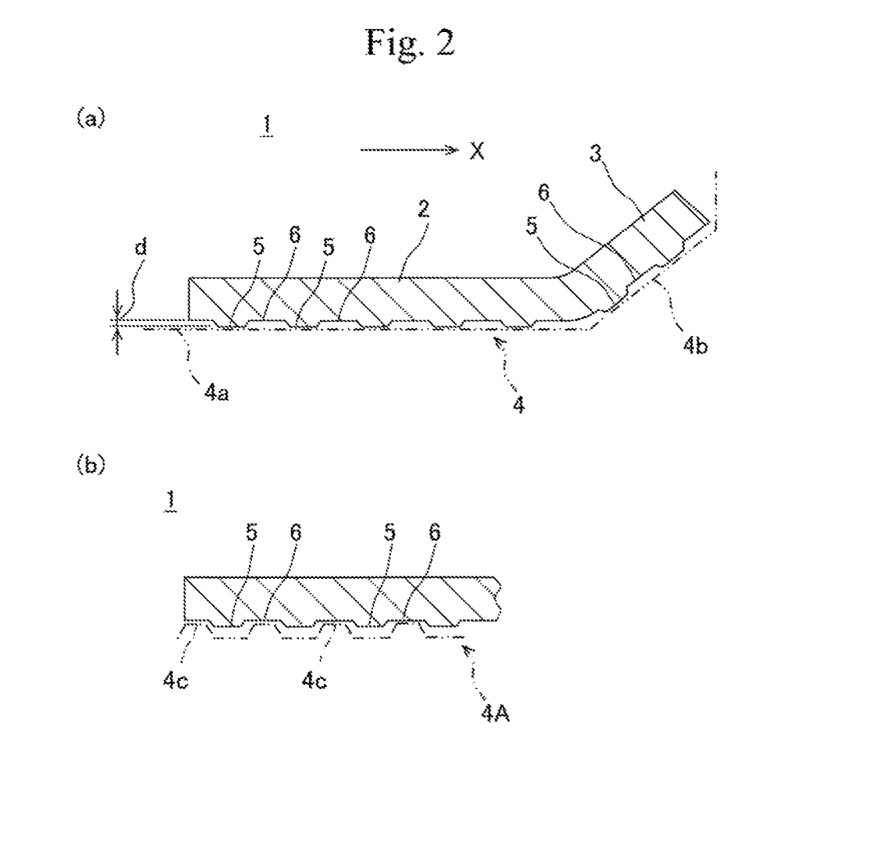
FIG. 2(a) is a cross-sectional view taken along the line A-A of FIG. 1.
FIG. 2(b) is a cross sectional view of the major part of a modified example of the floor panel.

In FIGS. 1 and 2, the floor spacer 1 of the present embodiment is used for interior materials of vehicles, and can reduce influences from vibrations and noise on the inside of a vehicle. The floor spacer 1 has a function of absorbing shock on passengers during collision of the vehicle as well as a function of flattening the unevenness of the floor panel of the vehicle. The floor spacer 1 is a molded foam made of expandable polystyrene resin, and includes a planar floor board part 2 and a toe board part 3 that includes an inclined plane continuous from the floor board part 2. The floor spacer 1 has a predetermined thickness. The floor board part 2 comes in contact with a floor panel 4a that is a vehicle structure 4 that constitutes the vehicle interior of the vehicle. The toe board part 3 comes in contact with an inclined part 4b of the vehicle structure where an accelerator pedal and a brake pedal are mounted, which is a part of a dividing wall to divide the vehicle interior and the engine room.

The lower face of the floor board part 2 of the floor spacer 1 is opposed to the floor panel 4a, and the lower face includes depressions 6 and projections 5. The projections 5 protruding downward constitute a contact face that comes in contact with the floor panel 4a, and the depressions 6 are different in level from the projections 5 to constitute a non-contact face that does not come in contact with the floor panel 4a. The lower face of the toe board part 3 also includes depressions and projections. The projections 5 constitute a contact face that comes in contact with the inclined part 4b, and the depressions 6 are different in level from the projections 5 to constitute a non-contact face that does not come in contact with the floor panel 4a. This floor spacer 1 is formed in the direction orthogonal to the travelling direction X of the vehicle. A difference d in level between the projections 5 and the depressions 6 has a dimension so that the depressions 6 do not come in contact with the floor panel 4a. The projections 5 of the floor spacer 1 constituting the contact face have a rough surface, and the depressions 6 constituting the non-contact face have a smooth surface that is smoother than the projections 5.

The rough surface of the projections 5, which is a feature of the present embodiment, is formed through transferring of the defining face of a mold to define the molding space that is described later. The mold is manufactured by casting. A part of the mold to form the projections 5 has a rough surface, and this rough surface is prepared by transferring of small depressions and projections at a wooden surface of a wooden form that is made of chemical wood, for example. Chemical wood comprises fine powder of wood mixed into a resin material. For instance, this may include about 50 weight % of wood powder mixed into polyurethane resin. The defining face of the mold to form the projections 5 therefore can have a grained surface as a rough surface, so that the projections 5 that are formed through transferring of the defining face of the mold also have a grained surface. Note here that the resin material for chemical wood is not limited to polyurethane resin and the weight % of wood powder also is not limited to the above. They, which also include the diameter of the wood powder, can be selected properly. While higher density of wood powder enables machining of a beautiful and accurate surface of the wooden form, lower density of wood powder can shorten the machining time but the machined surface will be rough.

The defining face to form the rough surface of the projections 5 of the floor spacer 1 may be formed with a molded foam article, for example, instead of chemical wood. Preferably the molded foam article is made of polystyrene resin. In this case, the roughness of the surface of the molded foam article can be adjusted by changing the expansion ratio. A larger expansion ratio means a rougher surface. A possible expansion ratio is 10 to 60 times, and the expansion ratio of about 50 times is preferable. A mold forming member corresponding to the wooden form may be prepared using such a molded foam article, and a mold may be prepared by casting with this mold forming member. Then, molding with this mold can form a rough surface at the projections 5 of the molded foam 1.

The surfaces of the projections (contact face) 5 protruding downward from the floor board part 2 and the toe board part 3 of the floor spacer 1 are rough surfaces having the gloss value in the range of 0.5 to 7. The gloss value indicates the gloss of the surfaces. This gloss value is specified by JIS (Japanese Industrial Standards), and can be measured with a gloss meter to measure the specular gloss of plastics, coating films, enamel and paper. Such a range of the gloss value is recognized as a grained surface when we touch the surface with a hand, for example, and the surface may have fine and regular projections and depressions. Meanwhile the depressions (non-contact face) 6 have a smooth surface that is smoother than the rough surface of the projections (contact face) 5.

As described above, the floor spacer 1 of the present embodiment has projections 5 at the face opposed to the floor panel 4a as a vehicle structure and at the face opposed to the inclined part 4b of the dividing wall, and these projections 5 have rough surfaces. Since the surfaces of the projections 5 have a gloss value in the range of 0.5 to 7, these projections can suppress high-pitched grating abnormal noise when they rub against with the floor panel 4a and the inclined part 4b, and have an excellent effect of reducing noise. Since the surfaces of the depressions 6 are smooth, they can reduce a contact resistance during demolding. This can speed up the demolding and improve the productivity.

Figure 3:
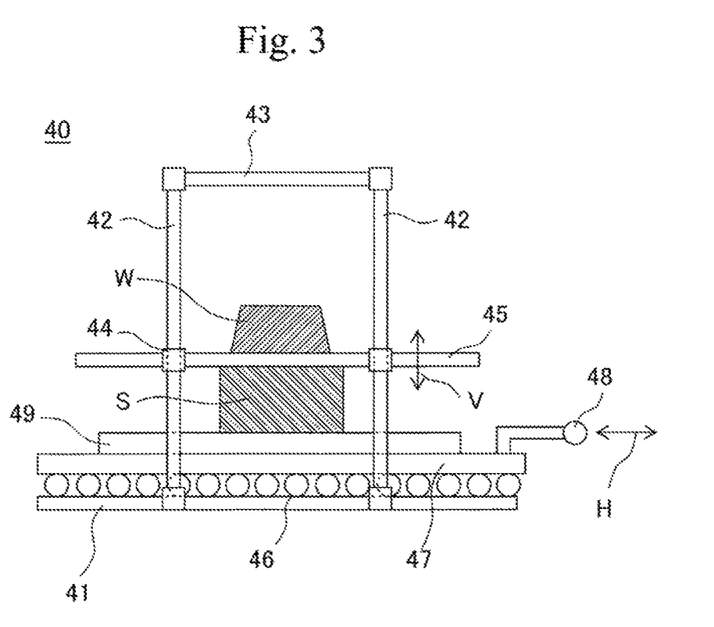
FIG. 3 shows the major part of a noise measurement device to evaluate the effect of reducing noise by the floor spacer of FIGS. 1 and 2.

FIG. 3 shows a noise measurement device to evaluate the effect of reducing noise, that is, the effect of suppressing high-pitched grating abnormal noise. The noise measurement device 40 includes a horizontally installed base 41, and four columns 42 erecting from the base. Tops of the four columns 42 are joined with a joint member 43. Each of the four columns 42 supports one sleeve 44 so that these four sleeves can move up and down, and a load-receiving base 45 is fixed to the four sleeves 44. As a result, the load-receiving base 45 can move in the up-down direction V while keeping the horizontal state that is parallel to the base 41.

On the base 41, a lot of rollers 46 are placed at predetermined intervals, and a manual sliding base 47 is placed on the rollers 46. The sliding base 47 can move in the horizontal direction B that is orthogonal to the axil direction of the rollers 46. A grip 48 is fixed to the sliding base 47, and an operator can move the slide base 47 with the grip 48. On the sliding base 47, a coated steel plate 49 is fixed. The coated steel plate 49 is to place a sample S thereon so that the sample S comes in contact with the load-receiving base 45. On the load-receiving base 45, a weight W is placed to press the sample S against the coated steel plate 49 via the load-receiving base 45.

More specifically, the noise-reducing effect can be measured as follows. A sample S with the dimensions of 50 mm×50 mm×30 mm (height) is cut out. Two surfaces of the sample with the dimensions of 50 mm×50 mm have surface skins. One of the surface skins (the surfaces of 50 mm×50 mm) of the sample is attached to the lower face of the vertically-movable load-receiving base 45 with a double-sided adhesive tape. The load-receiving base 45 has the own weight of 2 kg. After that, the sample S attached to the load-receiving base 45 is lowered until the sample comes in contact with the coated steel plate 49 for a close contact. The coated steel plate 49 adheres to the sliding base 47. Next, a weight W of 10 kg is placed on the load-receiving base 45.

Figure 4:
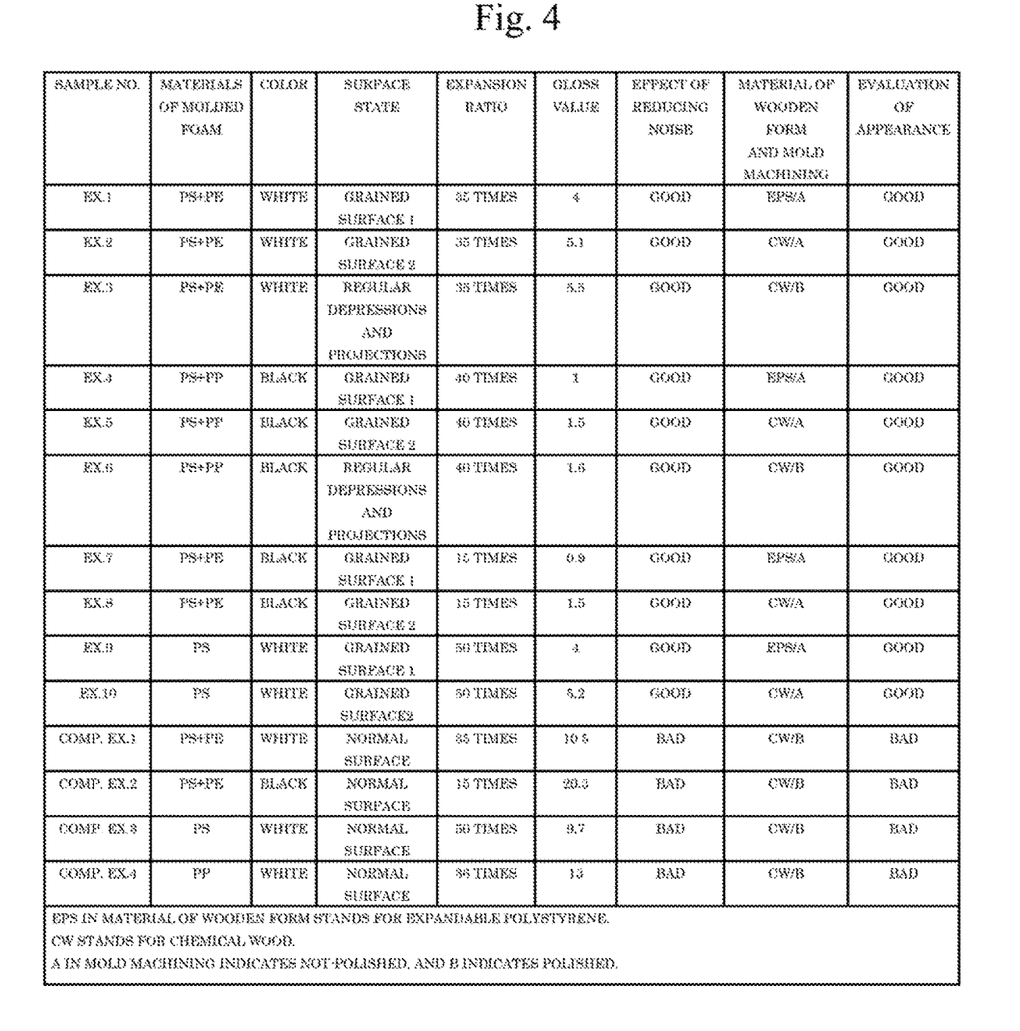
FIG. 4 is a table showing examples of the floor spacer in FIGS. 1 and 2 about the materials, the color, the surface state, the expansion ratio, the measurement of gloss value, the effect of reducing noise, the material of wooden form and mold machining, and the evaluation of appearance.

When the effect of reducing noise by a sample is measured using the thus configured noise measurement device 40, the operator holds the grip 48 and moves the sliding base back and forth so that the sample reciprocates five times, where the sliding stroke in the horizontal direction H is 5 cm and the sliding speed is 10 cm/sec. During this, the operator checks the frictional sound (abnormal sound). When the operator does not notice any frictional squeaky sound or hardly notice such sound, the sample is evaluated as "good" because it has the effect of reducing noise. When the operator notices any frictional squeaky sound, the sample is evaluated as "bad" because it does not have the effect of reducing noise. FIG. 4 shows the evaluation of samples about the effect of reducing high-pitched grating abnormal noise using the noise measurement device 40 as stated above as well as the visual evaluation of appearance of the samples. For the evaluation of appearance, when the operator does not find a hexagonal pattern on the surface of the molded foam or hardly finds such a pattern, the sample is evaluated as "good". When the operator clearly finds such a pattern, the sample is evaluated as "bad".

In FIG. 4, Example 1 having a sample No. 1 was made of composite resin of polystyrene (PS) and polyethylene (PE). The color of the sample was white, the surface state was grained surface 1, and the expansion ratio was 35 times. In this case, the measurement of gloss value was 4, the effect of reducing noise was good because it was effective, and the appearance also was evaluated as good. The gloss value of the surface of the molded sample was measured using the gloss meter (IG-320 produced by Horiba, Ltd.) in accordance with the gloss measurement method specified by JIS Z8741 and under the condition of reflection angle of 60°. The wooden form used in Example 1 was comprised of EPS (expanded polystyrene), and the machining of the mold was not-polished (A).

Example 2 was made of composite resin of polystyrene (PS) and polyethylene (PE). The color of the sample was white, the surface state was grained surface 2, and the expansion ratio was 35 times. In this case, the measurement of gloss value was 5.1, the effect of reducing noise was good because it was effective, and the appearance also was evaluated as good. The wooden form used in Example 2 was comprised of CW (chemical wood), and the machining of the mold was not-polished (A).

Example 3 was made of composite resin of polystyrene (PS) and polyethylene (PE). The color of the sample was white, the surface state was regular depressions and projections, and the expansion ratio was 35 times. In this case, the measurement of gloss value was 5.5, the effect of reducing noise was good because it was effective, and the appearance also was evaluated as good. The wooden form used in Example 3 was comprised of CW (chemical wood), and the machining of the mold was polished (B).

Example 4 was made of composite resin of polystyrene (PS) and polypropylene (PP). The color of the sample was black, the surface state was grained surface 1, and the expansion ratio was 40 times. In this case, the measurement of gloss value was 1, the effect of reducing noise was good because it was effective, and the appearance also was evaluated as good. The wooden form used in Example 4 was comprised of EPS (expanded polystyrene), and the machining of the mold was not-polished (A).

Example 5 was made of composite resin of polystyrene (PS) and polypropylene (PP). The color of the sample was black, the surface state was grained surface 2, and the expansion ratio was 40 times. In this case, the measurement of gloss value was 1.5, the effect of reducing noise was good because it was effective, and the appearance also was evaluated as good. The wooden form used in Example 5 was comprised of CW (chemical wood), and the machining of the mold was not-polished (A).

Example 6 was made of composite resin of polystyrene (PS) and polypropylene (PP). The color of the sample was black, the surface state was regular depressions and projections, and the expansion ratio was 40 times. In this case, the measurement of gloss value was 1.6, the effect of reducing noise was good because it was effective, and the appearance also was evaluated as good. The wooden form used in Example 6 was comprised of CW (chemical wood), and the machining of the mold was polished (B).

Example 7 was made of composite resin of polystyrene (PS) and polyethylene (PE). The color of the sample was black, the surface state was grained surface 1, and the expansion ratio was 15 times. In this case, the measurement of gloss value was 0.9, the effect of reducing noise was good because it was effective, and the appearance also was evaluated as good. The wooden form used in Example 7 was comprised of EPS (expanded polystyrene), and the machining of the mold was not-polished (A).

Example 8 was made of composite resin of polystyrene (PS) and polyethylene (PE). The color of the sample was black, the surface state was grained surface 2, and the expansion ratio was 15 times. In this case, the measurement of gloss value was 1.5, the effect of reducing noise was good because it was effective, and the appearance also was evaluated as good. The wooden form used in Example 8 was comprised of CW (chemical wood), and the machining of the mold was not-polished (A).

Example 9 was made of polystyrene (PS). The color of the sample was white, the surface state was grained surface 1, and the expansion ratio was 50 times. In this case, the measurement of gloss value was 4, the effect of reducing noise was good because it was effective, and the appearance also was evaluated as good. The wooden form used in Example 9 was comprised of EPS (expanded polystyrene), and the machining of the mold was not-polished (A).

Example 10 was made of polystyrene (PS). The color of the sample was white, the surface state was grained surface 2, and the expansion ratio was 50 times. In this case, the measurement of gloss value was 5.2, the effect of reducing noise was good because it was effective, and the appearance also was evaluated as good. The wooden form used in Example 10 was comprised of CW (chemical wood), and the machining of the mold was not-polished (A).

Comparative Example 1 was made of composite resin of polystyrene (PS) and polyethylene (PE). The color of the sample was white, the surface state was a normal surface, and the expansion ratio was 35 times. In this case, the measurement of gloss value was 10.5, the effect of reducing noise was bad because it was not effective, and the appearance also was evaluated as bad. The wooden form used in Comparative Example 1 was comprised of CW (chemical wood), and the machining of the mold was polished (B).

Comparative Example 2 was made of composite resin of polystyrene (PS) and polyethylene (PE). The color of the sample was black, the surface state was a normal surface, and the expansion ratio was 15 times. In this case, the measurement of gloss value was 20.3, the effect of reducing noise was bad because it was not effective, and the appearance also was evaluated as bad. The wooden form used in Comparative Example 2 was comprised of CW (chemical wood), and the machining of the mold was polished (B).

Comparative Example 3 was made of polystyrene (PS). The color of the sample was white, the surface state was a normal surface, and the expansion ratio was 50 times. In this case, the measurement of gloss value was 9.7, the effect of reducing noise was bad because it was not effective, and the appearance also was evaluated as bad. The wooden form used in Comparative Example 3 was comprised of CW (chemical wood), and the machining of the mold was polished (B).

Comparative Example 4 was made of polypropylene (PP). The color of the sample was white, the surface state was a normal surface, and the expansion ratio was 36 times. In this case, the measurement of gloss value was 13, the effect of reducing noise was bad because it was not effective, and the appearance also was evaluated as bad. The wooden form used in Comparative Example 4 was comprised of CW (chemical wood), and the machining of the mold was polished (B).

In the floor spacer 1 as stated above, the contact face that comes in contact with the vehicle structure 4 includes the projections 5, and the projections 5 have a rough surface. When the floor panel 4A of the vehicle structure 4 has ridges 4c as in FIG. 2(b) and the ridges come in contact with the depressions 6 of the floor spacer 1, the depressions 6 may have rough surfaces. In this case, the projections 5 may have a smooth surface that is smoother than the rough surface of the depressions 6. Such a smooth surface can reduce a contact resistance during demolding, and so this can speed up the demolding and improve the productivity.

Figure 5:
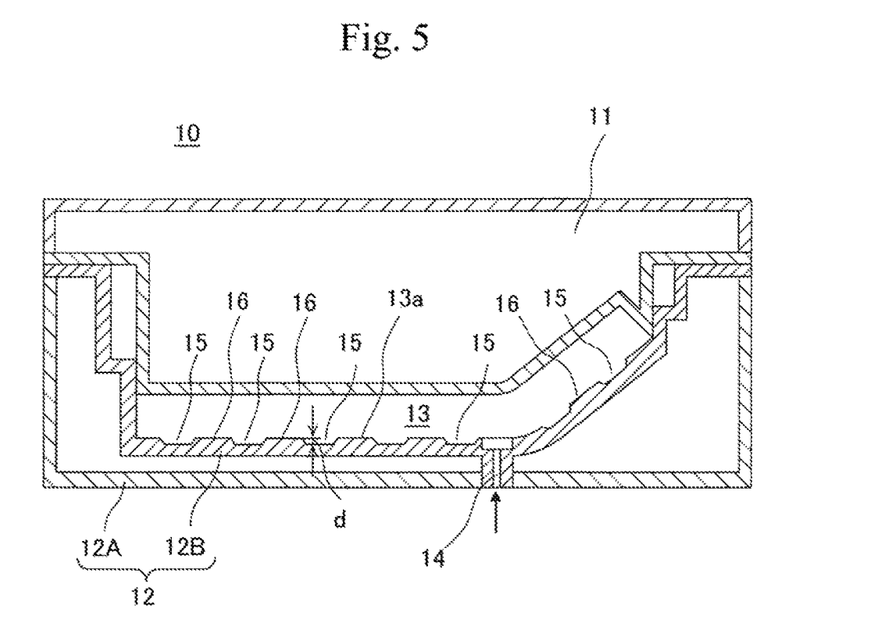
FIG. 5 is a cross sectional view of a mold to manufacture the floor spacer in FIGS. 1 and 2 through expansion and molding.

Referring next to FIGS. 5 to 8, the following describes a mold for manufacturing a floor spacer 1 through expansion and molding that is a molded foam according to the present embodiment. In FIG. 5, a mold 10 includes a mobile mold 11 and a fixed mold 12, and includes a cavity 13 as a molding space defined between the mobile mold 11 and the fixed mold 12. The cavity 13 of the mold 10 is defined as a space between the two molds. Expandable resin particles are charged into the space to manufacture a molded foam for vehicles. For the expandable resin particles, typical expandable resin particles can be used, which can expand for molding in the mold. For instance, expandable particles made of polystyrene resin may be used. This mold 10 has a port 14 through which expandable resin particles can be charged into the cavity 13. After filling the cavity 13 with the expandable resin particles, heated steam is introduced to heat the expandable resin particles in the cavity 13 for expansion and molding.

The cavity 13 has a flat part to form the floor board part 2 and an inclined part to form the toe board part 3. The flat part and the inclined part of the cavity 13 have a lower face 13a, and the lower face includes depressions 15 and projections 16. Between the depressions 15 and the projections 16, a difference d in level is defined. This difference in level 16 has a depth d, which is a difference d in level between the depressions and projections of the floor spacer 1. This lower face 13a of the cavity 13 forms the face of the floor spacer 1 molded with the mold 1 that is opposed to the vehicle structure 4. The depressions 15 form the projections 5 of the floor spacer 1, and the projections 16 form the depressions 6 of the floor spacer 1.

The following describes the mobile mold 12 in more details. The mobile mold 12 includes an outer part 12A located on the outside and an inner part 12B that constitutes one of the faces of the cavity 13. Referring to FIGS. 6 to 9, the following describes manufacturing of the inner part 12B in more details. The following describes an example where at least a part of the cavity 13 is formed using a rough surface that is prepared by transferring of depressions and projections of a wooden surface of a wooden form.

Figure 6:
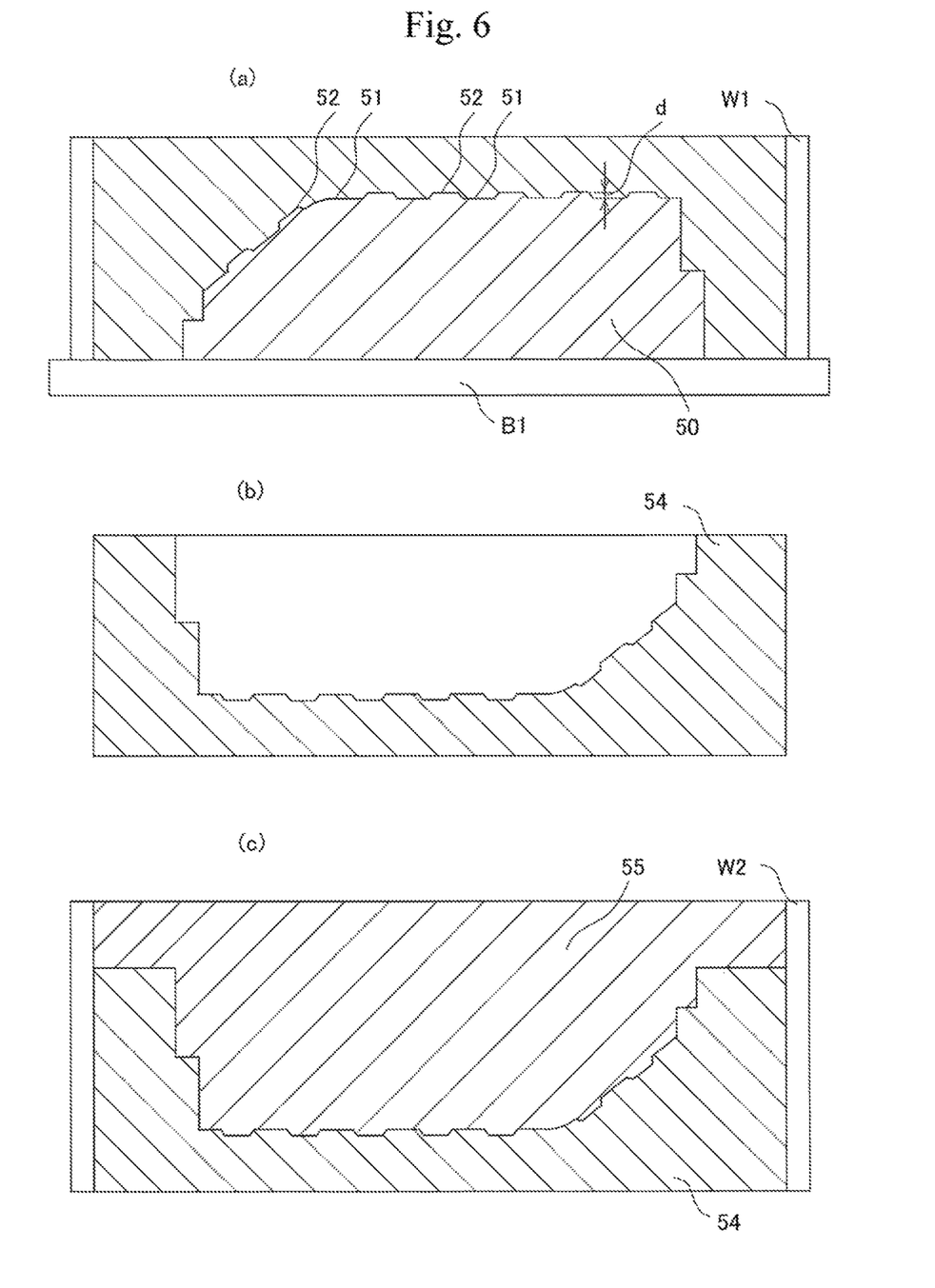
FIG. 6 is a cross-sectional view to show the manufacturing steps of one of the sand molds for one part that makes up a mobile mold of the mold shown in FIG. 5.

As shown in FIG. 6(a), a wooden form 50 is placed on a base B1. The wooden form is to transfer the fine depression and projections of the wooden surface to the cavity-defining face of the inner part 12B. The wooden form 50 includes chemical wood. The wooden form 50 has an upper face to form the cavity face, and the upper face includes depressions 51 and projections 52. A difference in level between the depressions 51 and the projections 52 is set at a depth d. This depth d of the difference in level is the same as the difference d in level between the depressions 6 and projections 5 of the floor spacer 1. The outer surface of the wooden form 50 has a wooden surface having fine depressions and projections. The surfaces of the depressions 51 and the projections 52 of the wooden form 50 also have a wooden surface having fine depressions and projections.

The wooden form 50 placed on the base B1 is surrounded with a frame to prepare a sand mold (hereinafter called a frame) W1, and casting sand is charged into the frame W1 so as to embed the wooden form 50. Next, the shape of the casting sand charged in the frame W1 is hardened by filling it with carbon dioxide gas. After that, the frame W1 is turned upside down and the wooden form 50 is removed, whereby a sand mold 54 having a hollow is manufactured as shown in FIG. 6(b). Then as shown in FIG. 6(c), this sand mold 54 is surrounded with a frame W2, and casting sand is charged into the hollow to manufacture a protruding sand mold 55.

Figure 7:
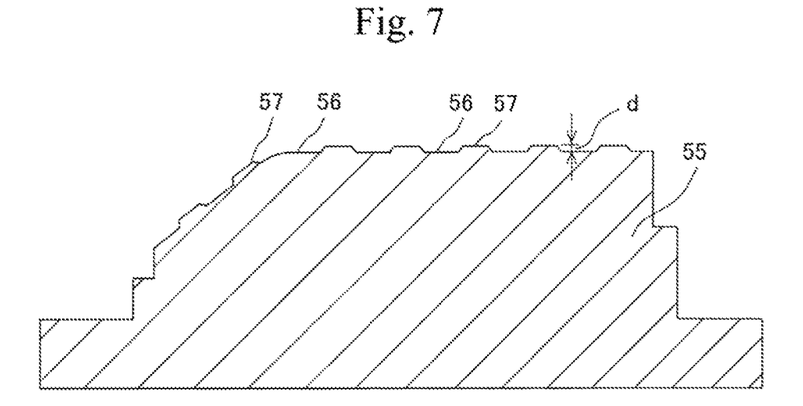
FIG. 7 is a cross-sectional view of the sand mold manufactured at the manufacturing steps shown in FIG. 6.

The thus manufactured protruding sand mold 55 is turned upside down, whereby a protruding sand mold 55 is obtained as shown in FIG. 7. The protruding sand mold 55 has depressions and projections at the upper part having the same shape as that of the depressions 51 and the projections 52 of the wooden form 50, and the outer surface including these depressions 56 and the projections 57 is a rough surface because the wooden surface having fine depressions and projections of the wooden form 55 is transferred there.

Figure 8:
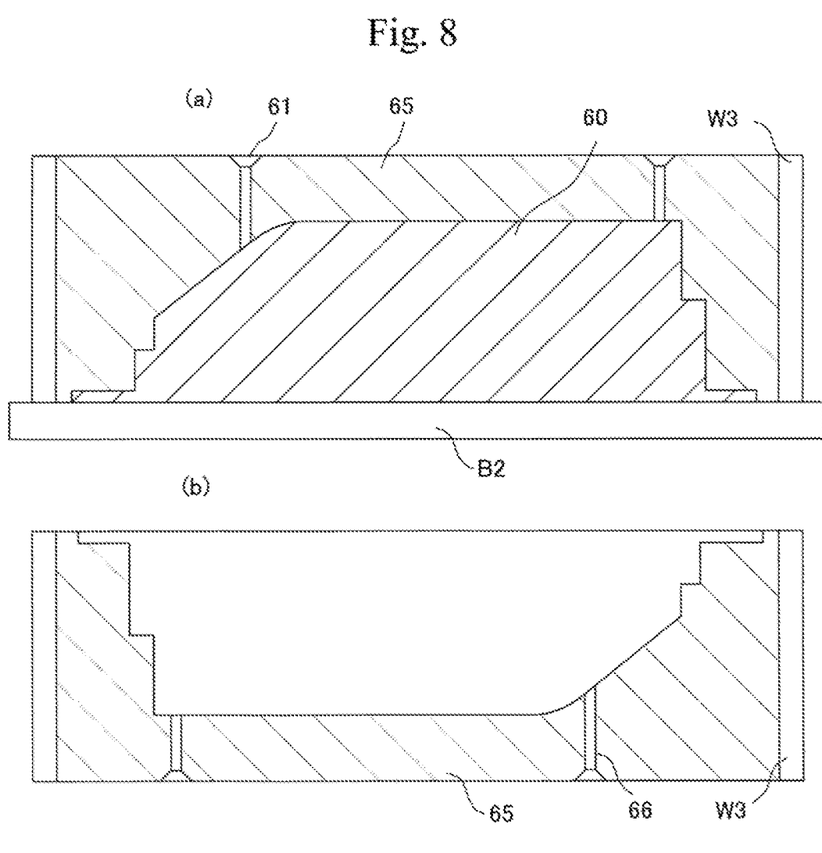
FIG. 8 is a cross-sectional view to show the manufacturing steps of the other sand mold for the one part that makes up the mobile mold of the mold shown in FIG. 5.

Next as shown in FIG. 8(a), a wooden form 60 to form the face on the inside of the inner part 12B is placed on the base B2, and the wooden form 60 is surrounded with a frame W3. Then casting sand is charged into the frame W3 so as to embed the wooden form 60. At this time, a sprue tap 61 is disposed so as to be in contact with the wooden form 60. The sprue tap is to form a sprue and a sprue channel. After that, casting sand is charged into the frame. Next, the shape of the casting sand in the frame W3 is hardened by filling it with carbon dioxide gas. After that, the frame W3 is turned upside down as shown in FIG. 8(b), and the wooden form 60 is removed, whereby a recessed sand mold 65 having a hollow is manufactured. This recessed sand mold 65 has a sprue through which molten metal is poured, and a sprue channel 66 for communication between the sprue and the hallow.

Figure 9:
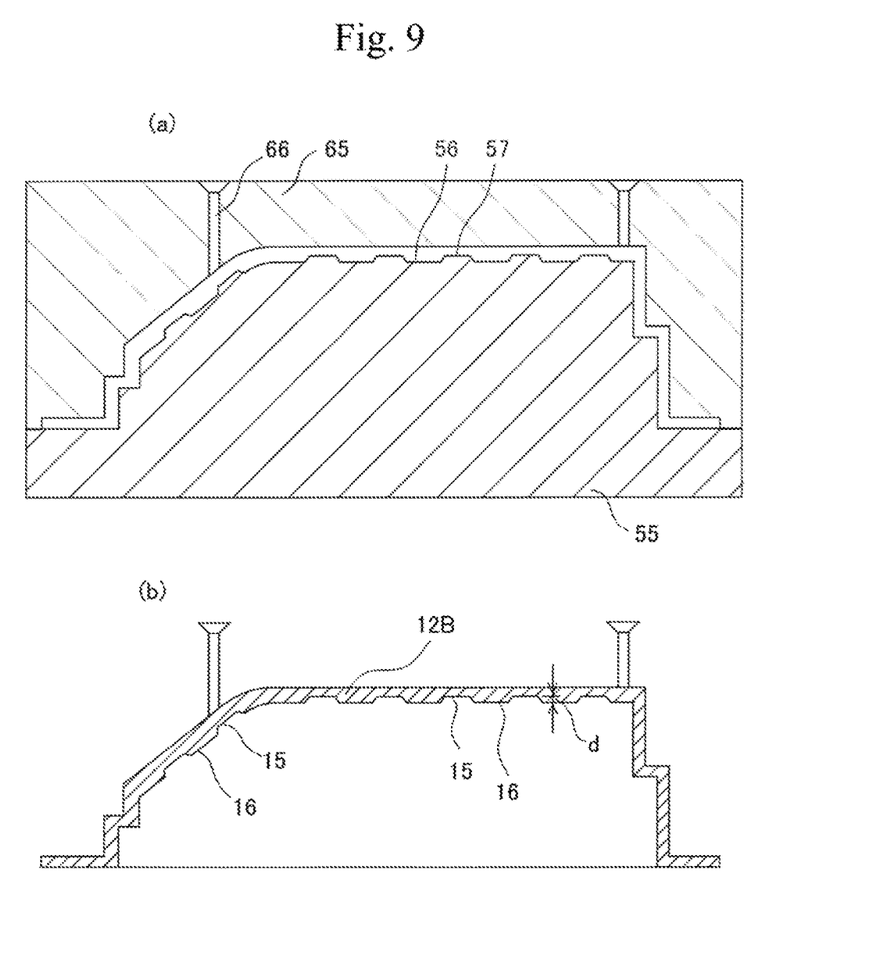
FIG. 9 is a cross sectional view of the combined sand molds shown in FIGS. 6 to 8.

Then as shown in FIG. 9(a), the recessed sand mold 65 shown in FIG. 8(b) is turned upside down, and this recessed sand mold is placed above the protruding sand mold 55 turned upside down manufactured first as shown in FIG. 7 so that the protruding sand mold 55 is located in the hollow of the recessed sand mold 65. In this way the protruding sand mold 55 and the recessed sand mold 65 are combined, whereby a sand mold to manufacture the inner part 12B of the mobile mold 12 can be prepared. Such overlapped sand molds, including the recessed sand mold 65 and the protruding sand mold 55, define a cavity between the sand molds. Molten metal, such as aluminum, is poured into this cavity through the sprue channel 66. Thereby the inner part 128 of the fixed mold 12 having a sprue can be manufactured as shown in FIG. 9(b). The sprue is then removed to finish the inner part 12B of the fixed mold.

Referring back to FIG. 5, the difference d in level between the depressions 15 and the protrusions 16 of the loner part 12B is formed by the projections 52 and the depressions 51, respectively, of the wooden form 50 during the casting of the inner part 128 of the fixed mold 12. That is, the depressions 51 and the projections 52 of the wooden form 50 form the difference d in level. The wooden form 50 is made of chemical wood as stated above, and the projections 52, at least at a protruding face, have a wooden surface having fine depressions and projections. This means that the depressions 15 of the cavity 13, at least at a bottom face, have a rough surface because the depressions and projections of the wooden surface of chemical wood are transferred to the bottom face. In this way, the wooden form 50 has a part to form the rough surface at the lower face 13a of the cavity 13. Meanwhile, the protruding faces of the projections 16 of the cavity 13 are ground surfaces that are shiny and smooth surfaces. In the illustrated example, the fixed mold 12 has a hollow and the mobile mold 11 also has a hollow. Both of the molds may be solid or may have a hollow.

In this mold 10, the depressions 15 and the projections 16 at the lower face 13a of the cavity 13 form the lower face of the floor spacer 1 as a molded foam for vehicles. Especially the depressions 15 form a face that comes in contact with the floor panel 4a as a vehicle structure and with the inclined part 4b of the dividing wall of the engine room. Preferably the mold 10 is turned upside down, so that the side having the port 14 in the drawing is directed upward.

In the thus configured mold 10, the depressions 15 of the cavity 13, which form the projections 5 of the floor spacer 1, have bottom surfaces that are rough surfaces. These rough surfaces are formed by the projections of the wooden form 50 having a wooden surface having depressions and projections, and therefore such rough surfaces can be easily formed in the cavity 13 of the mold 10. Then rough surfaces can be formed at the surfaces of the projections 5 at the lower face of the floor spacer 1, and such a floor spacer can reduce abnormal noise generated when the floor spacer 1 is placed in the vehicle, and the projections 5 come in contact with the floor panel 4a of the vehicle structure and the inclined part 4b of the dividing wall and they rub against each other.

Figure 10:
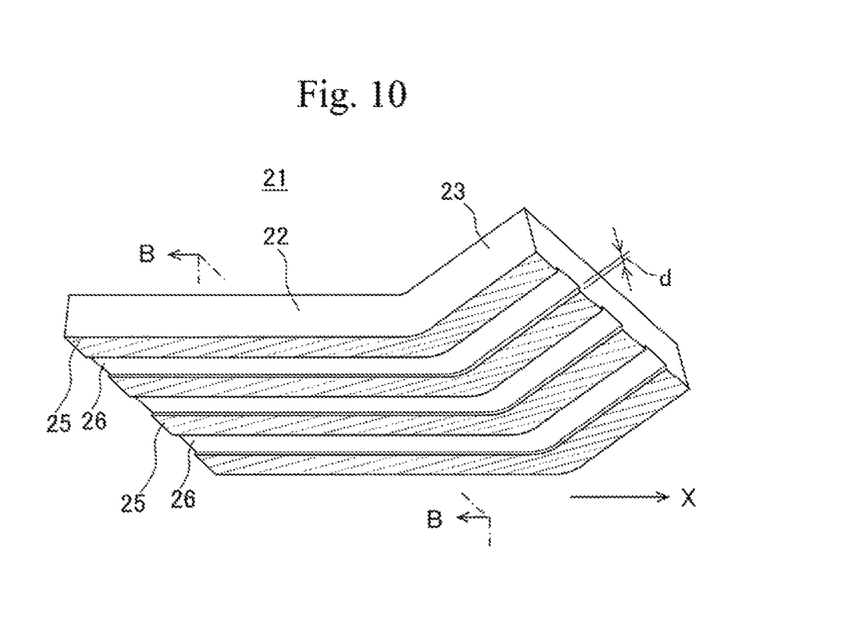
FIG. 10 is a perspective view of a floor spacer that is another embodiment of a molded foam for vehicles according to the present invention.
Figure 11:
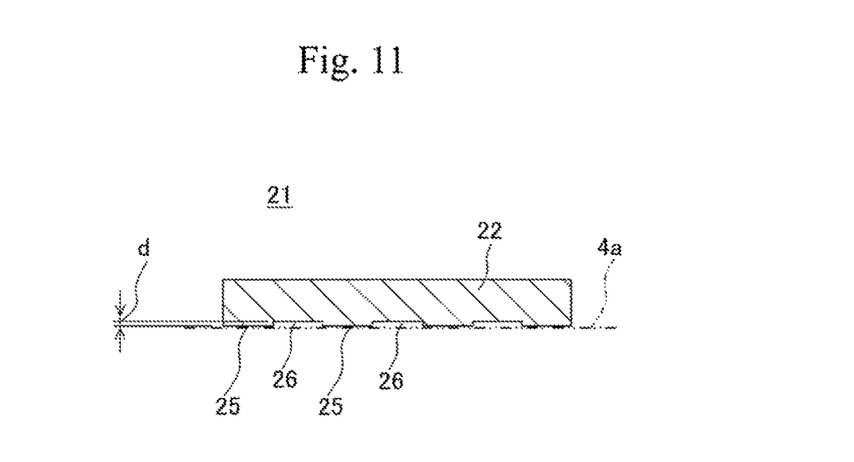
FIG. 11 is a cross sectional view taken along the line B-B of FIG. 10.

Referring next to FIGS. 10 and 11, the following describes another embodiment of a molded foam of the present invention in details. FIG. 10 is a perspective view of the floor spacer according to the present embodiment, and FIG. 11 is an enlarged cross-sectional view taken along the line B-B of FIG. 10. In the following description, like reference numerals designate like parts of the embodiment as stated above, and their description is omitted.

In FIGS. 10 and 11, a floor spacer 21 is a molded foam that is obtained by expanding and molding of synthetic resin, and is installed at a vehicle structure. Similarly to the above-described embodiment, this is a molded foam made of polystyrene-resin based expandable particles, and includes a planar floor board part 22 and a toe board part 23 that is an inclined plane continuous from the floor board part 22.

This floor spacer 21 also comes in contact with a floor panel 4a as a vehicle structure 4 at the planar floor board part 22. The toe board part 23 then comes in contact with an inclined part 4b where an accelerator pedal and a brake pedal are mounted, which is a part of a dividing wall to divide the vehicle interior and the engine room.

The lower face of the floor board pan 22 and the toe board part 23 of the floor spacer 21 has depressions and projections. Between them, the projections 25 protruding downward constitute a contact face that comes in contact with the floor panel 4a, and the depressions 26 are different in level from the projections 25. The floor spacer 21 of this embodiment is different from the above-described embodiment in the direction of depressions and projections. These depressions and projections extend in the longitudinal direction of the floor spacer 21, i.e., along the travelling direction X of the vehicle. For instance, one of the protrusions 25 extends from the planar floor board part 22 to the toe board part 23. This floor spacer 21 includes the projections 25 along the travelling direction X of the vehicle. When the ridges protruding from the floor panel 4a are orthogonal to the travelling direction X of the vehicle, for example, this configuration is preferable because it ensures a contact between the ridges and the projections 25.

The projections 25 of the floor spacer 21 in this embodiment have the outer surface, i.e., the lower face that are rough surfaces, and the depressions 26 have a smooth surface that is smoother than the projections 25. The rough surfaces may be grained surfaces or may have regular projections and depressions, for example, and have a gloss value in the range of 0.5 to 7. The gloss value indicates the gloss of the surfaces.

The floor spacer 21 of this embodiment also includes projections 25 and depressions 26 at the lower face, and the surfaces of the projections 25 are rough surfaces as grained surfaces. Such a floor spacer also can reduce abnormal noise when the floor board part 22 and the toe board part 23 come in contact with the floor panel 4a and the inclined part 4b of the vehicle structure 4 and they rub against each other.

In the above-stated embodiments, the surfaces of the projections between the depressions and the projections formed at the lower face of the floor spacer 1, 21 are rough surfaces. These rough surfaces are formed by a mold with the defining face having transferred depressions and projections of the wooden surface of the wooden form. Such a defining face of the mold is formed with the surface of the projections 52 of the wooden form 50 including chemical wood, and such a wooden form is a non-limiting example. When a wooden form including chemical wood is used, such a wooden form can have fine powders of wood at the surface. Therefore rough surfaces having the gloss values in the above-stated range can be easily prepared.

Figure 12:
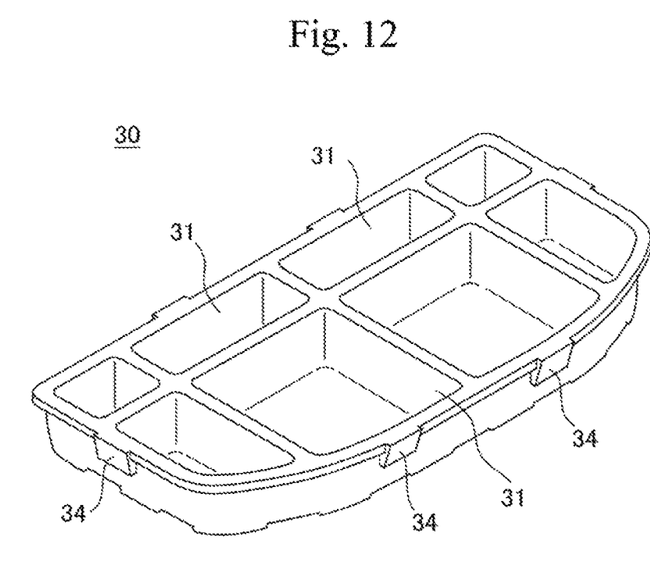
FIG. 12 is a perspective view of a luggage box that is another embodiment of a molded foam for vehicles according to the present invention.
Figure 13:
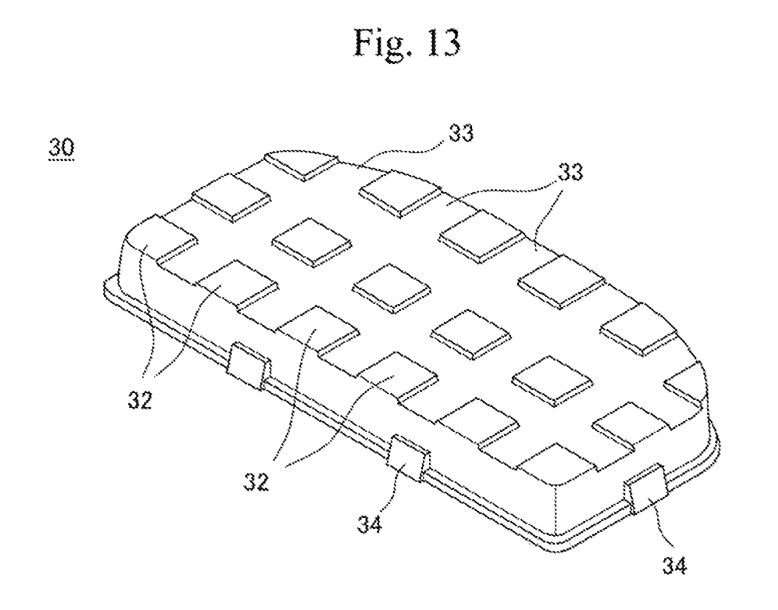
FIG. 13 is a perspective view of depressions and projections at the bottom face of the luggage box shown in FIG. 12.

Referring next to FIGS. 12 and 13, the following describes another example of the molded foam of the present invention, by way of an example of a luggage box. In FIGS. 12 and 13, a luggage box 30 is manufactured by expanding and molding expandable resin particles, and is placed on a floor in the trunk of a vehicle, for example. The luggage box 30 has a plurality of sections, and each section is a storage 31. A user can store various items in their corresponding sections. As shown in FIG. 13, this luggage box 30 includes depressions and projections at the bottom face. In one example, the surfaces of the projections 32 that protrude relative to the depressions 33 are rough surfaces, and the surfaces of the depressions 33 are smooth surfaces. This can reduce abnormal noise generated when the trunk floor as the vehicle structure and the luggage box 30 rub against each other. The entire upper face (outer surface) of the luggage box 30 may be rough surfaces to have high-quality appearance, whereby the appearance of the luggage box can be attractive and can be evaluated as "good". The surfaces of the projections 34 protruding from the circumference also can be rough surfaces, and this can reduce abnormal noise at a part of the vehicle structure to store this luggage box.

That is a detailed description of the embodiments of the present invention. The present invention is not limited to the above-stated embodiments, and the design may be modified variously without departing from the spirits of the present invention defined in the attached claims. For instance, the entire detailed configuration of the embodiments described above for explanatory convenience is not always necessary for the present invention. A part of one embodiment may be replaced with the configuration of another embodiment, or the configuration of one embodiment may be added to the configuration of another embodiment. A part of the configuration of each embodiment may include another configuration that is added, or may be deleted or replaced with another configuration.

The above describes one example of a molded foam for vehicles having depressions and projections along the direction orthogonal to the travelling direction of the vehicle and another example of having depressions and projections along the travelling direction of the vehicle. Instead of such linear depressions and projections, other depressions and projections of an appropriate shape, such as a round shape or a rectangular shape, may be formed, and surfaces of at least one of these depressions and projections may be rough surfaces and surfaces of the other may be smooth surfaces that are smoother than the rough surfaces.

When the molded foam manufactured with the mold 10 is a luggage box for vehicles, the edge at the circumference of the storage can have a rough finish surface to be matte. In this case, the appearance of the luggage box can be beautifully changed and looks high-class, so that the molded foam as a whole can be more attractive and have improved appearance.

INDUSTRIAL APPLICABILITY

A molded foam for vehicles of the present invention is applicable to interior materials for any vehicles, including cars. For cars, this molded foam, can be used as a floor spacer, a door pad, a tool box and the like.

A mold to mold a molded foam of the present invention is applicable to a mold to mold interior materials for any vehicles, including cars. For cars, this mold can be used as a floor spacer, a door pad, a tool box and the like. A mold to mold a molded foam of the present invention can be used as a mold to mold other molded foams, such as a wrapping material, a packing material, a cushioning material, a packaging container, a cold container and a heat-Insulating container.

REFERENCE SIGNS LIST 1, 21 Floor spacer (molded foam)
2, 22 Floor board part
3, 23 Toe board part
4 Vehicle structure
4a Floor panel (vehicle structure)
4b Inclined part of dividing wall (vehicle structure)
4c Ridges of floor panel
5, 25, 32 Projections (contact face)
6, 26, 33 Depressions (non-contact face)
10 Mold
11 Mobile mold
12 Fixed mold
12A Outer part
12B Inner part
13 Cavity (molding space)
13a Cavity face
15 Depressions
16 Projections
30 Luggage box (molded foam)
50 Wooden form
55 Protruding sand mold
65 Recessed sand mold

The invention claimed is:

1. A molded foam that is placed in a vehicle structure, the molded foam being prepared by expanding and molding synthetic resin in a molding space of a mold, comprising:
a contact face that comes in contact with the vehicle structure; and a non-contact face that does not come in contact with the vehicle structure, wherein the contact face is a rough surface, and the non-contact face is a smooth surface that is smoother than the contact face.

2. The molded foam according to claim 1, having a face opposed to the vehicle structure and including depressions and projections at the face, wherein
the contact face is disposed at least at one of the depressions and the projections.

3. The molded foam according to claim 2, wherein the contact face is a rough surface having a gloss value in a range of 0.5 to 7, the gloss value indicating gloss of the contact face.

4. The molded foam according to claim 1, wherein one of faces of the molding space that is formed by transferring depressions and projections of a wooden surface of a wooden form forms the contact face.

5. A floor spacer for vehicles,
which comprises the molded foam according to claim 1.

6. A luggage box for vehicles,
which comprises the molded foam according to claim 1.

* * * * *